Nov. 22, 1955  A. H. FAULKNER  2,724,553
TIME INTERVAL METER
Filed April 5, 1950  2 Sheets-Sheet 1

FIG. 1

INVENTOR.
ALFRED H. FAULKNER
BY
*Chas. M. Cardy*
ATTORNEY

Nov. 22, 1955 — A. H. FAULKNER — 2,724,553
TIME INTERVAL METER
Filed April 5, 1950 — 2 Sheets-Sheet 2

FIG. 2

INVENTOR.
ALFRED H. FAULKNER
ATTORNEY

United States Patent Office 2,724,553
Patented Nov. 22, 1955

2,724,553

TIME INTERVAL METER

Alfred H. Faulkner, Chicago, Ill., assignor to Automatic Electric Laboratories, Inc., Chicago, Ill., a corporation of Delaware Application April 5, 1950, Serial No. 154,136

12 Claims. (Cl. 235—92)

This invention relates in general to time interval meters, but is more particularly concerned with the type utilizing the electronic counter circuits.

The principal object of the present invention is to provide an interval timer that is less expensive and more accurate than systems heretofore used.

A feature of the present invention is the reliable operation with high precision of indication in the case of high speed impulses.

Another object of the present invention is to prevent false operations in the counter circuit when a tube fails to operate.

Another feature of the present invention is the use of a rectifier in the counter circuit to prevent false operations when a tube fails to operate.

Other objects of the invention will appear upon a further perusal of the specification taken in conjunction with the accompanying drawings which illustrate an embodiment of the invention in the form of a schematic circuit diagram.

The present invention is provided to be used as an interval timer to measure the operate and release time of relays, with either make or break contacts, operating on direct current. The voltage range may be from 10 v. D. C. to 150 v. D. C. Relays operating on alternating current, or outside of the direct current range, may be timed by using an external slave relay. Further, the time duration of a single voltage pulse, or the time interval between two pulses, either overlapping or non-overlapping, appearing in separate circuits or the time interval between two pulses appearing successively in one circuit can be measured. The present invention also provides sharp marker pulses in decade steps ranging from 1 C. P. S. to 100 kc., which may be used to establish accurate sweep speeds on oscilloscopes, or to superimpose timing markers on a waveform viewed on an oscilloscope. The invention may therefore be used as a means for calibrating oscillators of the marker frequencies, or at multiple or sub-multiple frequencies. The position of all major components shown in the figures correspond with their actual location in the physical embodiment of the timer.

The oscillator is of the electron-coupled type, which is crystal controlled. The operation of the same is similar to that disclosed in Patent No. 2,124,189 issued on July 19, 1938 to J. B. Dow on the Constant Frequency Oscillator System. However, it is to be noted that any oscillator may be used that has a desirable frequency stability. The oscillator used in the present invention provides a 100 kc. signal and maintains a frequency stability of ±.005% over a 0 to 50° C. ambient temperature range. The stability of the oscillator determines the accuracy of the present invention. However, an additional error of ±10 microseconds results from the uncertainty of the point in a cycle at which the timing is started and stopped. The crystal controlled oscillator herein disclosed may use the 6AK6 type of tube and operates continuously when the power switch is turned on. The oscillator frequency may be varied slightly by adjustment of the 50 M. M. F. variable air condenser 100 shown in Fig. 2.

Figure 2:
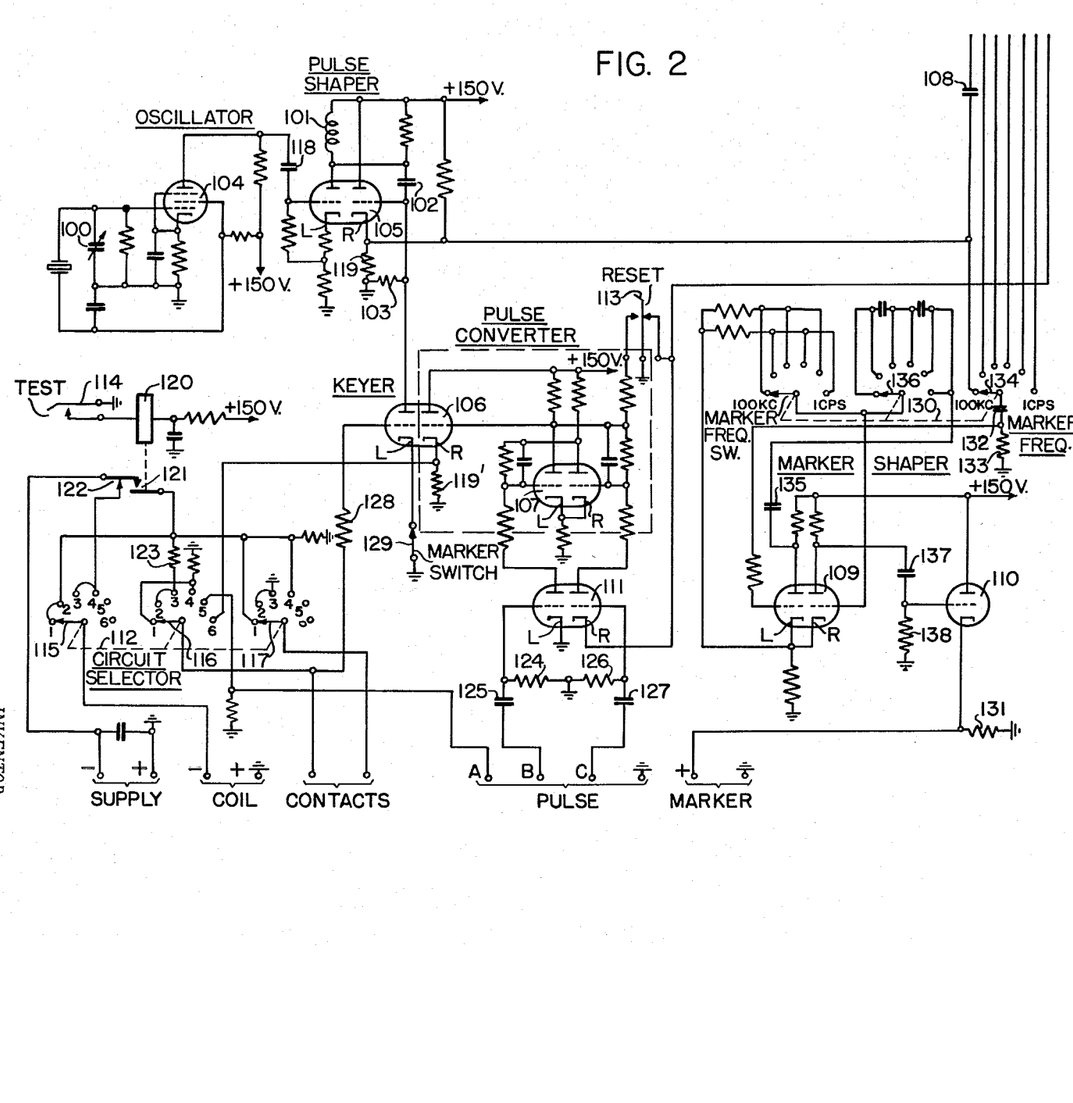
Fig. 2 is a diagrammatic illustration of the oscillator, pulse shaper, keyer, pulse converter, marker shaper and circuit selector.

The pulse shaper, which is well-known in the art, uses the 12AU7 type tube. The waveform of the voltage appearing in the plate circuit of the oscillator rises gradually during eighty percent of a cycle and then drops abruptly during the remaining twenty percent of a cycle. Just prior to the abrupt voltage drop the plate current of the left triode of the pulse shaper is nearly constant, resulting in a negligible voltage drop across the 10 mh. choke 101. The abrupt voltage drop in the grid circuit nearly cuts off this triode, thereby causing its plate potential to swing positive to +300 v.; then negative to +75 v., then positive again to +150 v.; negative again to +130 v. and finally positive to +150 v., at which point the cycle is repeated. These voltage values are approximate only and are given merely to facilitate understanding of the operation. The action of the right triode renders precise control of the voltage across choke 101 unnecessary. The voltage across this choke would be a damped oscillation swinging symmetrically above and below 150 v., except for the fact that the left triode remains cut off for only a small fraction of the cycle. The rising plate current which follows the abrupt drop prevents any oscillations other than the first from exceeding the 150 v. value.

The voltage developed across the 10 mh. choke 101 is applied to the grid of the right triode of the pulse shaper through a 25 M. M. F. condenser 102. This grid is also connected to ground through a 100 K ohm resistor 103, which is normally shunted by the plate to cathode path of the keyer triode. As the keyer triode operates at zero bias it is equivalent to a 10 K ohm resistor shunting the 100 K ohm grid resistor 103 of the pulse shaper. The cathode of the right triode is biased to approximately +50 v., which is four times the cut-off bias of a 12AU7. Because of the shunting action of the keyer, the voltage impressed on the grid of the right triode is insufficient to overcome the large cathode bias, hence the cathode potential normally remains constant at +50 v.

The keyer uses also the type 12AU7 tube and is well-known in the art. The grid of the keyer is switched by the circuit selector to various circuits, depending upon the type of time measurement to be performed. In all cases, the grid is driven negative beyond cut-off during the unknown time interval and returns to zero at the end of the time interval to be measured. The various circuits for controlling the keyer are described hereinafter. The first large positive swing of the left triode plate of the pulse shaper following cut-off of the keyer drives the right triode gride of th pulse shaper beyond the grid current point. The voltage available is far beyond that necessary to reach the grid current point, hence the amplitude of the output pulse obtained from the cathode of the right triode of the pulse shaper is substantially independent of the amplitude of the plate swing of the left triode of the pulse shaper. The rapid discharge of 25 M. M. F. coupling condenser 102 followed by the negative swing of the left triode plate of the pulse shaper again cuts off the right triode of the pulse shaper which remains cut-off for the remainder of the cycle. The pulse obtained from the cathode of the right triode of the pulse shaper rises from +50 v. to approximately +85 v. in one-tenth of a microsecond and decays to +50 v. in one microsecond. This pulse is applied through a .001 mf. condenser 108 to the input of the first decade, causing it to advance one step for each pulse. The 100K ohm grid resistor 103 of the right triode of the pulse shaper restores the charge on the 25 M. M. F. coupling condenser 102 to its initial value towards the end of each cycle thus insuring that the grid will be driven beyond the grid current point on the next pulse.

It is to be noted that the oscillator is normally operated and its plate circuit feeds the grid circuit of the left triode of the pulse shaper. The bias on the right triode of the pulse shaper is normally 50 v. The anode-cathode circuit of the keyer is in shunt with the 100K ohm resistor 103 which is in the grid circuit of the right triode of the pulse shaper. During the unknown interval of time, which is the time to be measured, the keyer is non-conducting. The remainder of the time the keyer is conducting. When the keyer is conducting the effective resistance of its anode-cathode circuit is 10K ohms, which in shunt with resistor 103, does not provide a high enough grid resistance for the pulse shaper, which is biased at 50 v. However, when the keyer is at cut-off, the effective grid resistance of the right triode of the pulse shaper is 100K ohms, thereby enabling the signal to the grid of the right triode to be greater than 50 v. to thereby enable the right triode of the pulse shaper to conduct. The output pulses are produced across the 15K ohm resistor of the cathode circuit of the right triode of the pulse shaper to produce the pulses to operate the decade counter.

Figure 1:
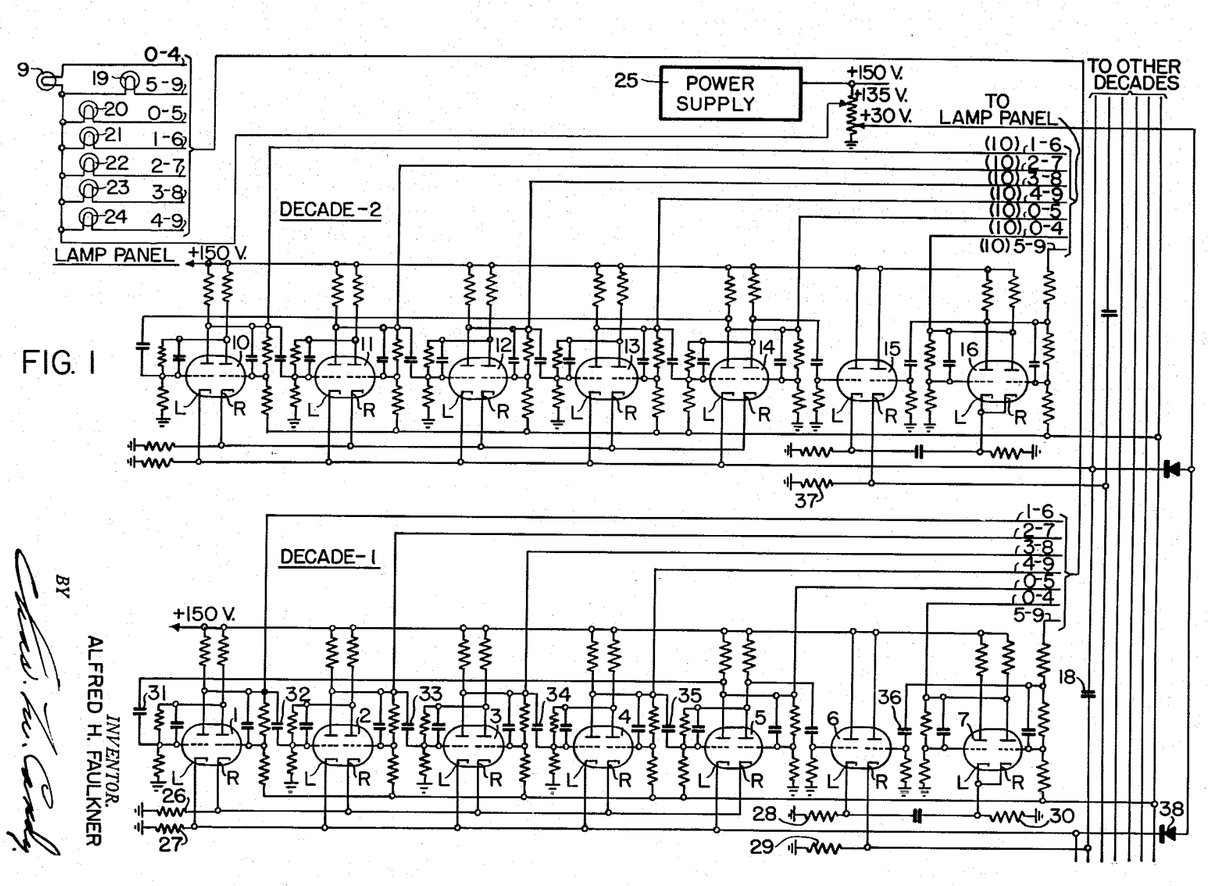
Fig. 1 is a diagrammatic illustration of the decade counters.

Each decade counter consists of a scale-of-five ring counter and a scale-of-two counter. A cathode follower is used to operate the scale-of-two counter for each cycle of the scale-of-five counter. A second cathode follower delivers a driving pulse to the input of the succeeding decade counter for each cycle of the scale-of-two counter. The decade counters are 12AU7 type tubes. The operation of the decade counters in theory is somewhat similar to those described in the article "Electronic Computing Circuits of the ENIAC" written by A. W. Burke and appearing in "Proceedings of the IRE," August 1947, pp. 756–767. The pulses from the pulse shaper are fed to the cathodes of the L triodes of the decade counter. For the decade counter the scale-of-five counter comprises the following tubes 1, 2, 3, 4 and 5. The cathode followers comprise tube 6 and the scale-of-two counter comprises tube 7. Each tube comprises a twin triode designated L for the left triode and R for the right triode. It is to be noted that the circuits of the scale-of-five and the scale-of-two counters are so arranged that only one triode of the twin triode tube can conduct at one time. For example, when triode L conducts, triode R is non-conducting and vice versa. Further, the triode L of each pair of the scale-of-five counter is a registering triode and triode R of each pair is a non-registering triode. It is to be noted that the plate circuit of each triode L of the counters is connected to a lamp of the lamp indicator panel thereby registering the digit when the respective tubes conduct. Decade 2 is similar in construction to decade 1. Further decades 3, 4 and 5 are not shown for purposes of simplicity, and they too, are similar in construction to decade 1. The plate of the L triode of tube 1 operates the lamp registering the digits 1 and 6, the plate of the L triode of tube 2 operates the lamp registering the digits 2 and 7, the plate of the L triode of the tube 3 operates the lamp registering the digits 3 and 8, et cetera.

The plate of the L triode of each pair is coupled to the grid of the L triode of the succeeding pair by means of a condenser for providing for the sequential operation. The R triodes of tubes 1, 2, 3, 4 and 7 are normally conducting; whereas the L triode of tube 5 is normally conducting.

In the operation of the scale-of-five counters there are two opposing potentials to be considered in the operation of each tube. First, the input pulses from the pulse shaper are positive pulses and as they are impressed across the cathode, the bias thereof is increased. The opposing potential on the other hand is stored in the coupling condensers connecting the plates and grids of the respective tubes and the pulses coupled by these condensers are also positive, but they oppose the biasing potential. Therefore, when a certain tube is non-conducting, the plate voltage thereof produces a maximum positive surge. The grid coupled thereto has a high positive potential enabling the tube to conduct. A more detailed analysis will be described hereinafter. It is to be noted that decade 1 controls the operation of unit digit lamps; decade 2 controls the operation of the tens digit lamps; decade 3 controls the operation of the hundredths lamps et cetera.

The first pulse transmitted from the pulse shaper through the coupling condenser 108 biases the L triode of tube 5 beyond cut-off thereby extinguishing the same. As a result thereof, the lamp indicating zero extinguishes and the R triode of tube 5 becomes conductive. Further, the L triode of tube 1 also becomes conductive and thereby the lamp indicating the digit 1 operates.

The second pulse transmitted from the pulse shaper through the coupling condenser 108 biases the L triode of tube 1 beyond cut-off thereby extinguishing the same. As a result thereof, the lamp indicating 1 extinguishes and the R triode of tube 1 becomes conductive. Further, the triode L of tube 2 becomes conductive and thereby the lamp indicating the digit 2 operates.

The third pulse transmitted from the pulse shaper through the coupling condenser 108 biases the L triode of tube 2 beyond cut-off thereby rendering the same non-conductive. As as result thereof, the lamp indicating the digit 2 extinguishes and the R triode of tube 2 becomes conductive. Further, the L triode of tube 3 becomes conductive and thereby the lamp indicating the digit 3 operates.

The fourth pulse transmitted from the pulse shaper through the coupling condenser 108 biases the L triode of tube 3 beyond cut-off, thereby rendering the same non-conductive. As a result thereof, the lamp indicating the digit 3 extinguishes and the R triode of tube 3 becomes conductive. Further the L triode of tube 4 becomes conductive and thereby the lamp indicating the digit 4 operates.

The fifth pulse transmitted from the pulse shaper through the coupling condenser 108 biases the L triode of tube 4 beyond cut-off thereby rendering the same non-conductive. As a result thereof, the lamp indicating the digit 4 extinguishes and the L triode of tube 5 once again becomes conductive and thereby the lamp indicating the digit 5 operates. Further, the R triode of tube 4 now becomes conductive. As a result of the L triode of tube 5 conducting, the R triode of tube 5 becomes non-conductive.

At this point, it is desirable to digress to explain the operation of the lamp panel. In the upper left hand corner of Fig. 1 is shown the panel view representing the units digits. Similar arrangements are had for the tens, hundredths, et cetera, but they are not shown for purposes of simplicity. When the R triode of the scale-of-two counter 7 is conducting, the lamp connected to the 0, 4 conductor lights. When the L triode of the scale-of-two conductor 7 is conducting, the lamp connected to the 5, 9 conductor lights. When the lamps which are controlled by the conduction of the scale-of-five counter tubes 1, 2, 3, 4 and 5, operate, the digit this lamp represents is determined by which one of the first-mentioned lamps is operated with it. For example, if the lamp controlled by conductor 0, 4 is operated, and the lamp controlled by the conductor 0, 5 is operated, the digit represented by the operation of the lamp controlled by the 0, 5 conductor is 0. Now, if the lamp controlled by conductor 5, 9 is operated and the lamp controlled by 3, 8 conductor is operated, then the digit represented by the operation of the lamp controlled by the conductor 3, 8 is 8. In other words, when the lamp controlled by the conductor 0, 4 operated, lamps further operated thereto represent the digits 0, 1, 2, 3 or 4. Further, when the lamp controlled by the conductor 5, 9 is operated, lamps further operating thereto represent the digits 5, 6, 7, 8 or 9. As a result thereof a digit lamp can represent one of two digits depending upon which master lamp is operated.

At the outset, it was noted that the L triode of tube 5 was conducting and the R triode of tubes 1, 2, 3, 4 and 7 were conducting. This conduction is controlled by the position of the reset push button, which in the normal position is grounded. Therefore, initially the lamp controlled by the conductor 0, 4 was operated. Further, when the L triodes of the tubes 1, 2, 3, 4 and 5 operated in the manner heretofore explained, the digits represented were 0, 1, 2, 3 and 4.

Returning now to the operation of the decade counter, the L triode of tube 5 was rendered conductive by the fifth pulse. As a result thereof, the R triode of tube 5 is non-conducting. A surge of current through the coupling condenser 17 renders the L cathode follower conductive. As a result thereof a flip-flop operation of the scale-of-two counter 7 is had and now the L triode of the tube 7 is conductive and R triode of tube 7 is non-conductive. Therefore, the lamp controlled by the 5, 9 conductor is operated, so now the digits to be illustrated are 5, 6, 7, 8 and 9. The conduction of the L triode of tube 7 enables the R cathode follower of tube 6 to remain non-conductive.

The sixth pulse transmitted from the pulse shaper through the coupling condenser 108 biases the L triode of tube 5 beyond cut-off thereby rendering the same non-conductive. As a result thereof, the lamp indicating the digit 5 extinguishes and the L triode of tube 1 once again becomes conductive and thereby the lamp indicating the digit 6 operates. Further the R triode of tube 5 is now conducting. As a result of the L triode of tube 1 conducting, the R triode of tube 1 becomes non-conductive.

The seventh pulse transmitted from the pulse shaper through the coupling condenser 108 biases the L triode of tube 1 beyond cut-off thereby rendering the same non-conductive. As a result thereof the lamp indicating the digit 6 extinguishes and the L triode of tube 2 once again becomes conductive and thereby the lamp indicating the digit 7 operates. Further, the R triode of tube 1 is now conducting. As a result of the L triode of tube 2 conducting, the R triode of tube 2 is non-conductive.

The eighth pulse transmitted from the pulse shaper through the coupling condenser 108 biases the L triode of tube 2 beyond cut-off thereby rendering the same non-conductive. As a result thereof the lamp indicating the digit 7 extinguishes and the L triode of tube 3 once again becomes conductive and thereby the lamp indicating the digit 8 operates. Further, the R triode of the tube 2 is now conducting. As a result of the L triode of tube 3 conducting the R triode of tube 3 is non-conductive.

The ninth pulse transmitted from the pulse shaper through the coupling condenser 108 biases the L triode of tube 3 beyond cut-off thereby rendering the same non-conductive. As a result thereof the lamp indicating the digit 8 extinguishes and the L triode of tube 4 once again becomes conductive and thereby the lamp indicating the digit 9 operates. Further, the R triode of tube 3 is now conducting. As a result of the L triode of tube 4 conducting, the R triode of tube 4 is now non-conductive.

The tenth pulse transmitted from the pulse shaper through the coupling condenser 108 biases the L triode of tube 4 beyond cut-off thereby rendering the same non-conductive. As a result thereof the lamp indicating the digit 9 extinguishes and the L triode of tube 5 once again becomes conductive and thereby the lamp indicating the digit 0 operates. Further, the R triode of tube 4 is now conducting and the R triode of tube 4 is non-conductive.

The R triode of tube 5 being non-conductive, a result thereof is that L triode of the cathode follower 6 becomes conductive. Thereupon the scale-of-two counter 7 has another flip-flop operation, and as a result thereof the R triode of tube 7 becomes conductive. The R triode of tube 7 conducting renders the L triode of tube 7 non-conductive. Thereupon the R triode of the cathode follower conducts to transmit a pulse across its cathode resistor through the coupling condenser 18 to the decade 2 counters. As a result thereof the L triode of tube 14 becomes non-conductive and the L triode of tube 10 becomes conductive to operate the tens digit 1 lamp, not shown.

The next ten pulses from the pulse shaper will repeat the operation as heretofore explained. At the termination of the succeeding ten pulses, the L triode of tube 10 is rendered non-conductive and as a result thereof L triode of tube 11 becomes conductive to operate the lamp representing the digit 20. The operation of decade 2 is similar to the operation of decade 1. The remaining decade counters operate in a similar manner as decade 2. The decade 1 repeats its operation for every ten pulses transmitted from the pulse shaper. The decade 2 repeates its operation for every 100 pulses transmitted from the pulse shaper, et cetera.

In case of low emission, heater burnout, or the like, of a tube, the counting is stopped. This result is accomplished by the 1N34 germanium diodes connected between the input circuits of each decade and the 30 v. tap on the power supply voltage divider. In the absence of these diodes, failure of a tube in one of the ring counters would permit the voltage on the input lead to fall until some other tube in the ring switched to the registering condition, resulting in a false count. Counting would continue from the tube registering falsely until the tube which failed was reached, at which point the operation would be repeated. The diodes are normally non-conductive and play no part in the normal operation of the counters, but in the event of such a failure the corresponding diode becomes conductive and maintains the input lead of the defective decade sufficiently positive to prevent any of the tubes in the ring from switching to the registering condition. All five neon lamps associated with the defective ring are then extinguished. Succeeding decades remain at zero, or in their last condition if the failure occurs in the midst of a count.

The circuit selector switch, which is of the type well-known in the art, is set in accordance with the type of time interval measurement to be made. The first four positions of this switch are used for relay timing. When used for this purpose the supply terminals are connected to the relay power supply, which may be from 10 v. to 150 v. D. C. The coil terminals and contact terminals are connected to the relay. Either break or make contacts may be used.

The operate time with break contacts is measured with the selector in the first position. The test push-button is depressed and held until the relay under test has operated fully. A relay in the timer connects the negative supply terminal to the negative coil terminal. The grid of the keyer is connected to the negative terminal of the relay under test through its break contact, causing the counting circuits to operate until the contacts are opened. The operate time is read from the neon indicator lamp panel. The test pushbutton may be released, after the relay has operated, without disturbing the count. The counting circuits are restored to zero by momentarily operating the reset pushbutton.

The operate time with make contacts is measured with the selector in the second position. In this way the grid of the keyer is connected to the negative coil terminal through a 10K ohm resistor, causing counting to start when the relay circuit is closed. The grid end of this resistor is grounded by the make contact of the relay under test when it operates, thus stopping the counters.

The release time with break contacts is measured with the selectors in the third position. In this case the negative supply terminal is normally connected to the negative coil terminal through break contacts on the internal relay. When the internal relay operates in response to the operation of the test push-button, it first connects the negative supply terminal to the keyer through the 10 K ohm resistor and subsequently opens the circuit to the relay under test. Counting starts just before the relay circuit is opened. When the relay under test restores, it connects direct ground through its break contacts to the grid end of the 10 K ohm resistor to stop the counters. The indicated count is greater than the actual release time by an amount dependent upon the transfer time of the make-before-break contacts on the internal relay. The transfer time is approximately thirty microseconds, and hence may ordinarily be inconsequential. When measuring very short release times this error should be taken in account and deducted from the actual reading. The transfer time is very consistent, but may be checked by connecting the timer terminals in the manner described hereinafter.

The release time with make contacts is measured with the selector in the fourth position. The internal relay again connects the negative supply terminal to the keyer grid just before opening the circuit to the relay under test. When the relay under test restores, it opens the circuit to the keyer grid at its make contacts. For greatest accuracy the thirty microsecond transfer time error of the internal relay should be deducted from the reading.

The transfer time of the internal relay may be measured by transferring the negative terminal of the direct current supply to the right terminal marked contacts and connecting the left terminal marked contacts to the negative terminal marked COIL. The positive supply terminal should be left free. The selector is set to the fourth position, where release time using make contacts is normally measured. The test pushbutton is then depressed and held until the lamp indicator is read. The grid of the keyer is connected to the negative terminal of the battery during the transfer time of the relay contacts. When the test pushbutton is released the relay restores and the keyer is again operated. As the release operation disturbs the count, the transfer time must be read before the test pushbutton is released.

The fifth position of the selector is used to measure the duration of a single pulse, or to integrate the total duration of a series of pulses. The pulse source is connected between the "A" grid and ground pulse terminals. The polarity must be such that the "A" terminal is driven negative during the pulse interval. The keyer is cut-off during the pulse interval, or during each pulse of the series. The lamp indicator shows the duration of the single pulse or the total duration of the series.

The sixth position of the circuit selector is used to measure the interval between two pulses, either overlapping or non-overlapping appearing in separate circuits, or to measure the interval between two pulses appearing consecutively in the same circuit. In the first condition, the first pulse source is connected between the "B" and ground pulse terminals and the second pulse source is connected between the "C" and ground pulse terminals. Timing commences when the "B" terminal is driven negative. Fast waveforms are essential to the operation, since short time constants are employed in the pulse converter so that short intervals may be measured. The "B" terminal may remain negative or may return to its initial potential without any effect. Timing stops when the "C" terminal is driven negative. The "C" terminal may also remain negative or may return to its original potential without any effect. The "B" pulse reverses the state of the flip-flop circuit in the pulse converter and the "C" pulse restores the flip-flop circuit to its initial state. The rectangular wave generated by the flip-flop is applied to the keyer by a cathode follower and an R.-C. coupling circuit. The time constant of the latter circuit limits the maximum interval between the input pulses to be measured to several seconds. The pulse converter uses the type 12AU7 tubes.

When it is desired to measure the interval between successive pulses appearing in the same circuit, the "B" and "C" pulse terminals are strapped together and are connected to the negative terminal of the pulse source. The positive terminal of the source is connected to the ground pulse terminal as before. The flip-flop circuit now functions as a scale-of-two counter, which reverses its state once for each input pulse.

To use the interval timer as a frequency standard or sweep calibrator, the marker switch is turned on. This opens the cathode circuit of the keyer and causes the counter decades to be driven continuously at the crystal frequency. The marker frequency switch enables pulses to be obtained from any of the decades. These pulses are too short to be useful as timing markers, particularly at the lower frequencies, hence the marker shaper is provided to stretch these pulses to a value proportional to the interval between pulses. The marker shaper uses the type 12AU7 tubes. The shaper consists of a conventional asymmetrical cathode-coupled multivibrator followed by a cathode follower. The amplitude of the marker pulse is approximately 75 volts. The output impedance is sufficiently low to operate a high resistance relay at 1 C. P. S. This circuit is also operative during timing operations, hence such a relay may be used to stop an electro-magnetic counter once each time the last decade recycles.

The marker pulses may be used in several ways to calibrate oscillators. One method is to apply the marker pulses to the Z-axis of an oscilloscope and to apply the oscillator output to the vertical input circuit of the oscilloscope. The oscillator frequency is then varied until the timing markers appear stationary on the oscillator waveform. The number of timing markers appearing in one cycle of the oscillator waveform, or the number of cycles of the oscillator waveform appearing between timing markers, is determined by the ratio between the oscillator frequency and the marker frequency. An interpolation oscillator may be used in conjunction with the interval timer to obtain accurate frequencies not integrally related to the marker frequencies.

The majority of oscilloscopes are not provided with Z-axis input circuits. In this case, the marker pulses may be applied to the external synchronizing pulse input. The vertical input should first be connected to the marker output, and the oscilloscope should then be adjusted to obtain a single marker pulse on the screen. The vertical input is then transferred to the oscillator output and the frequency varied to obtain a stationary pattern. The number of cycles which appear, or the number of times the pattern intersects a vertical line in the case of sub-multiple frequencies, is determined by the ratio between the oscillator frequency and the marker frequency. Odd frequencies may be checked with the aid of an interpolation oscillator as heretofore mentioned.

To calibrate the oscillator 104, the marker switch is turned on and the marker frequency switch is set on 100 kc. The marker output is then loosely coupled through a small condenser to the input of a radio receiver capable of receiving station WWV, preferably on 5 mc. The oscillator trimmer is then adjusted for zero beat. The power supply may be of any well-known type suitable for systems of this type and therefore is shown in form of a block diagram.

*Detail description*

A more detailed description of the system in its entirety will now be considered. Consider first the measurement of the operate time of break contacts. The selector switch 112 is first positioned to the first contact as shown in Fig. 2. The terminals marked supply are connected to the power supply of the relay under test, which may be from 10 to 150 v. D. C. The terminals marked coil are connected to the coil of the relay under test, and the terminals marked contacts are connected to the contacts of the relay under test. The test pushbutton 114 is depressed until the relay under test has operated fully. Relay 120, the internal relay of the timer, operates over the following path: battery, relay 120, make contact of test push-button 114 and ground. Contacts 121 make before contacts 122 break to operate the relay under test over the following path: ground, positive side of the coil terminal, relay under test, negative side of the coil terminal, wiper 115, contacts 1 and 2 of the selector switch 112, contacts 121, negative side of the supply terminal, battery, not shown, positive side of the supply terminal and ground. The keyer tube 106 has the grid of the L triode connected to the negative side of the coil terminal through the contacts of the relay under test over the following path: grid of the L triode of tube 106, resistor 128, left side of contacts terminal, contacts of the relay under test, right side of contacts terminal, wiper 117, contact 1, contacts 2, 1, wiper 115, negative side of the coil terminal.

As was heretofore described, the oscillator 104 and the keyer 106 are normally operated. The 100 kc. oscillations produced by the oscillator 104 are impressed on the grid of the L triode of the pulse shaper 105 through the D. C. blocking condenser 118. The L triode of the pulse shaper 105 operates in response to the oscillations received and produces a pulse across the choke coil 101. Initially the R triode of the pulse shaper is not conducting. The cathode bias of the R triode of tube 105 is approximately 50 v. With the L triode of keyer 106 normally conducting the effective grid resistance of the R triode of tube 106 is not high enough in value that a signal impressed across it will produce a high enough positive potential to drive the R triode of tube 106 into conduction. It is to be noted that the grid resistance 103 of the tube 105 is 100K ohms. The anode cathode circuit of the L triode of tube 106 is in shunt with the resistance 103 so that when the tube 106 conducts the effective grid resistance of the R triode of tube 105 is 10K ohms.

When the make contacts of the relay under test are operated, the negative potential applied to the L triode of the keyer 106 renders the tube non-conducting. Therefore, the L triode of tube 106 is not conducting during the unknown interval. As a result thereof, the grid resistance of the R triode of tube 105 is approximately 100K ohms, which is great enough to make the tube conduct. The pulse signal produced by the L triode 105, as heretofore described, drives the R triode of tube 105 through the blocking condenser 102. The grid potential produced thereto is approximately 50 volts.

The pulses produced by the pulse shaper 105 during the unknown time interval are produced across the 15 K ohm cathode resistor 119 and is fed through the coupling condenser 108 to the decade 1 counters. At this point, it is to be noted that the R triodes of tubes 1, 2, 3, 4 and 7 are conducting and whereas the L triode of tube 5 is conducting. The reset pushbutton 113 is in the normal position and has a ground connection.

Tubes 1, 2, 3, 4 and 5 comprise the scale-of-five counter. Tube 7 comprises the scale-of-two counter. Tube 6 is composed of two cathode followers. Each tube of the following 1, 2, 3, 4, 5 and 7 comprises an L and R triode. The L and R triode of each tube aforementioned is considered a pair. When the L triode of the aforementioned tubes conduct, the R triode of the pair is non-conducting and vice versa. This is caused by the fact that the plate of each triode of a pair is connected to the grid of the other triode forming the pair. The cathode bias on each tube is approximately 30 volts. When one tube of a pair conducts, its plate voltage is at a minimum and thereby is not great enough to drive the other tube of the pair into conduction. Likewise, when a tube of a pair is non-conducting, its plate voltage is at a maximum, which is great enough to drive the other tube of a pair into conduction.

The scale-of-two counter 7 controls the operation of the master lamps 9 and 19 through the conductors 5—9 and 0—4. The scale-of-five counters 1, 2, 3, 4 and 5 control the operation of the digit lamps 20, 21, 22, 23 and 24 through the conductors, 0, 5; 1, 6; 2, 7; 3, 8; 4, 9, respectively. The operation of the master lamps determine which digit the digit lamp represents. For example, digit lamp 20 represents the digits 0 and 5. When the master lamp 19 is operated, the digit represented by digit lamp 20 is 5; whereas when the master lamp 9 is operated, the digit represented by digit lamp 20 is zero. Further, the L triodes of the aforementioned are the registering triodes and the R triodes of the aforementioned are the non-registering triodes.

The R triode of tube 7 is normally operated in a manner heretofore described. As a result thereof, master lamp 9 is operated over the following path: ground, resistor 30, cathode of the R triode of tube 7, plate of the R triode of tube 7, 0—4 conductor, lamp 9, and the 135 v. terminal of the power supply 25. Further, the L triode of tube 5 is conducting in a manner heretofore described. As a result thereof lamp 20 is operated to indicate zero over the following path: ground, resistor 27, cathode of the L triode of tube 5, plate of the L triode of tube 5, conductor 0, 5, lamp 20, 135 v. terminal of the power supply 25.

The first pulse transmitted from the pulse shaper 105 in a manner heretofore described produces a voltage across the common cathode resistor 27, which biases the L triode of tube 5 beyond cut-off, thereby rendering the same non-conducting. As a result thereof, lamp 20 extinguishes over a path heretofore described for operating the same. Further, the R triode of tube 5 conducts because of the coupling from the plate of the L triode to the grid of the R triode. Further, the L triode of tube 1 is now conducting, since the grid of the L triode of tube 1 is A. C. coupled to the plate of the L triode of tube 5 through a blocking condenser 31.

The L triode of tube 1 is conducting at the end of the first pulse and the lamp 21 is operated to indicate the digit 1 over the following path: ground, resistor 27, cathode of the L triode of tube 1, plate of the L triode of tube 1, conductor 1, 6, lamp 21, and the 135 v. terminal of power supply 25. As a result thereof the R triode of tube 1 is non-conducting for reasons heretofore stated.

The second pulse transmitted from the pulse shaper 105 in a manner heretofore described produces a voltage across the common cathode resistor 27, which biases the L triode of tube 1 beyond cut-off thereby rendering the same non-conducting. As a result thereof, lamp 21 extinguishes over a path heretofore described for operating the same. Further, the R triode of tube 1 conducts because of the coupling from the plate of the L triode to the grid of the R triode. Further, the L triode of tube 2 is now conducting, since the grid of the L triode of tube 2 is coupled to the plate of the L triode of tube 1 through a blocking condenser 32.

The L triode of tube 2 is conducting at the end of the second pulse and the lamp 22 is operated to indicate the digit 2 over the following path: ground, resistor 27, cathode of the L triode of tube 2, plate of the L triode of plate 2, conductor 2, 7, lamp 22, 135 v. terminal on the power supply 25. As a result thereof, the R triode of tube 2 is non-conducting.

The third pulse transmitted from the pulse shaper 105 in a manner heretofore described produces a voltage across the common cathode resistor 27, which biases the L triode of tube 2 beyond cut-off thereby rendering the same non-conductive. As a result thereof, lamp 22 extinguishes over a path heretofore described for operating the same. Further, the R triode of tube 2 conducts because of the coupling from the plate of the L triode to the grid of the R triode. Further, the L triode of tube 3 is now conducting, since the grid of the L triode of tube 3 is A. C. coupled to the plate of the L triode of tube 2 through a blocking condenser 33.

The L triode of tube 3 is conducting at the end of the third pulse and the lamp 23 is operated to indicate the digit 3 over the following path: ground, resistor 27, cathode of the L triode of tube 3, plate of the L triode of tube 3, conductor 3, 8, lamp 23, 135 v. terminal of the power supply 25. As a result thereof, the R triode of tube 3 is non-conducting.

The fourth pulse transmitted from the pulse shaper 105 in a manner heretofore described produces a voltage across the common cathode resistor 27, which biases the L triode of tube 3 beyond cut-off thereby rendering the same non-conductive. As a result thereof, lamp 23 extinguishes over a path heretofore described for operating the same. Further, the R triode of tube 3 conducts because of the coupling from the plate of the L triode to the grid of the R triode. Further, the L triode of the tube 4 is now conducting, since the grid of the L triode of tube 4 is A. C. coupled to the plate of the L triode of tube 3 through the blocking condenser 34.

The L triode of tube 4 is conducting at the end of the fourth pulse and the lamp 24 is operated to indicate the digit 4 over the following path: ground, resistor 27, cathode of the L triode of tube 4, plate of the L triode of tube 4, conductor 4, 9, lamp 24, 135 v. terminal of power supply 25. As a result thereof, the R triode of tube 4 is non-conducting for reasons heretofore described.

The fifth pulse transmitted from the pulse shaper 105 in a manner heretofore described produces a voltage across the common cathode resistor 27, which biases the L triode of tube 4 beyond cut-off thereby rendering the same non-conductive. As a result thereof, lamp 24 extinguishes over a path heretofore described for operating the same. Further, the R triode of tube 4 conducts because of the coupling from the plate of the L triode to the grid of the R triode. Further, the L triode of tube 5 is now conducting, since the grid of the L triode of tube 5 is A. C. coupled to the plate of the L triode of tube 4 through the blocking condenser 35.

The L triode of tube 5 is conducting at the end of the fifth pulse and the lamp 20 is operated to indicate the digit 5 over the following path: ground, resistor 27, cathode of the L triode of tube 5, plate of the L triode of tube 5, conductor 0, 5, lamp 20, 135 v. terminal of the power supply 25.

As a result of the R triode of tube 5 being non-conductive, the potential on the plate of the same is at a maximum. The A. C. coupling through the condenser 17 is thereby high enough to drive the L cathode follower of tube 6 into conduction. A pulse is now produced across the cathode resistor 28 and the scale-of-two counter 7 acting as a cathode follower through its cathode resistor 30 effectuates a flip-flop operation. In its normal operation, the R triode of tube 7 is conducting and the L triode of tube 7 is non-conducting. By the flip-flop operation the L triode of tube 7 becomes conductive and the R triode of tube 7 becomes non-conductive. The flip-flop operation is caused by the cross coupling between the plates and the grids of the pair of tubes. The activity is well-known in the scale-of-two counters and the operation herein used is similar. To be more explicit, the pulse across resistor 30 renders the R triode non-conducting. This maximum potential variation on the plate of the R triode through an A. C. coupling condenser is great enough to render the L triode conductive. When the L triode conducts subsequent to the termination of the pulse, the plate potential at the L triode which is coupled to the R triode is inadequate to overcome the cathode bias of the R triode.

As a result of the R triode of tube 7 being nonconductive lamp 9 extinguishes over a path previously described for operating the same. However, the master lamp 19 operates because of the L triode of tube 7 conducting over the following path: ground, resistor 30, cathode of the L triode of tube 7, plate of the L triode of tube 7, conductor 5—9, lamp 13, 135 v. terminal of the power supply 25. As a result of lamp 19 operating all unit digits will be between 5–9 depending upon which digit lamp is operated.

The sixth pulse will operate the system in a similar manner as did the first pulse; the seventh pulse will operate the system in a similar manner as did the second pulse; and the eighth pulse will operate the system in a similar manner as did the third pulse, et cetera.

Now when the tenth pulse renders the L triode of tube 5 non-conductive, the R triode of tube 5 is conductive for reasons heretofore described. As a result thereof, the L triode cathode follower of tube 6 becomes conductive in a manner heretofore described. Subsequently another flip-flop action occurs iin the scale-of-two counter 7 in a manner heretofore described. As a result of this flip-flop action, the L triode of tube 7 becomes non-conductive and the R triode of tube 7 becomes conductive. Therefore, the master lamp 9 operates and the master lamp 19 extinguishes.

When the L triode of tube 7 becomes non-conductive, the R triode of tube 6 becomes conductive because of the A. C. coupling through the condenser 36. The decade–1 is now in its normal operating condition.

Decade–2 is similar in operation to decade–1. Therefore, the L triode of tube 14 is normally conducting. As triode R of tube 6 conducts a pulse is produced across the cathode resistor 29. This pulse renders the L triode of tube 14 non-conductive in a manner heretofore described for the operation of the system when the first pulse from the pulse shaper 105 was transmitted.

As a result thereof, the L triode of tube 10 conducts in a similar manner to that heretofore described. Decade–2 registers the tens digit on a lamp panel similar to that described in the operation of decade–1.

It is to be noted that the lamp connected to the plate of the L triode of tube 10 will register the tens digit 10 or 60 depending upon which master lamp is operated.

The next ten pulses from the pulse shaper will operate the decade–1 in a similar manner to that heretofore described. However, at the completion of the last ten pulses, the R triode of tube 6 will again conduct and another pulse will be produced across the resistor 29. This last-mentioned pulse will be transmitted to the decade–2 through the condenser 18 and this time will render the L triode of tube 10 non-conducting. As a result thereof, the L triode of tube 11 will conduct. Therefore, the decade–2 receives one pulse from the resistor 29 for every ten pulses transmitted from the pulse shaper 105.

Decades 3, 4, 5, et cetera, are similar in operation to decade 2. The pulse for decade–3 will be produced when the R triode of tube 15 conducts. The pulse across 37 will be transmitted to the decade–3 in a manner similar to that heretofore described. The ultimate result is that decade–2 is pulsed once for every ten pulses transmitted by pulse shaper 105. Decade–3, not shown, is pulsed once for every 100 pulses transmitted from pulse shaper 105. Decade–4, not shown, is pulsed once for 1000 pulses transmitted by pulse shaper 105, et cetera.

Consider now the function of the rectifier 38 in respect to the operation of the decade–1 counters. Each tube of the counters is normally biased to approximately 30 v. The bias for the L triodes of the ring-of-five counters is maintained by the current flow through the cathode resistor 27. Only one L triode is conducting at a time. Therefore, this cathode bias is maintained by that one tube conducting. If a tube is burned out and therefore not able to produce current, there is no cathode bias present when it is supposed to be normally conducting. Therefore, another tube will conduct to give an erratic operation because of the absence of the cathode bias. When this condition occurs the rectifier 38 will now conduct over the following path to provide a 30 v. bias: power supply 25, 30 v. terminal, rectifier 38, resistor 27 and ground. When the system is operating normally, 30 v. appears across the resistor 27; therefore in normal operation there is no current flow through the rectifier 38. When a faulty tube is present, the 30 v. bias produced from the power supply 25 is adequate to prevent the faulty decade from operating when the faulty tube again appears in the operation of the decade.

When the contacts under test are opened at the termination of the unknown interval, keyer tube 106 is no longer held at cut-off over a path previously described for holding the keyer 106 at cut-off. As a result thereof, the grid resistor 103 of tube 105 is again shunted by the anode-cathode circuit of the keyer tube 106. Therefore, the R triode of tube 105 does not conduct for reasons previously described. Consequently, the pulse shaper 105 does not transmit any larger pulses to the decade counter.

To restore the counting circuits to zero, the reset pushbutton 113 is depressed momentarily. The removal of the ground connect to the reset button 113 renders all operated triodes non-conducting except the L triode of tubes 5, 14, et cetera.

For measuring the operate time with make contacts, the connections heretofore described for measuring the operate time with break contacts are used. However, the selector switch 112 is now positioned on the second contacts. In this case the grid of the keyer is connected to the negative coil terminal through a 10K ohm resistor over the following path: grid of the L triode of tube 106, wiper 116, contact 2, resistor 123, contact 2, wiper 115, negative terminal, relay under test, positive terminal and ground.

The potential applied to the grid of the L triode of the keyer 106 is adequate to cut-off the keyer when the relay under test is operated. The operation hereinafter is similar to that just described in reference to the measurement of the operate time with break contacts.

When the contacts under test operate to terminate the unknown time interval, a ground is applied to the grid of the L triode of the keyer 106 over the following path: grid of the L triode of tube 106, contacts under test, wiper 117, contacts 2 and ground. As a result thereof, the keyer is again conducting to prevent further pulses to be transmitted from the pulse shaper 105.

For measuring the release time with break contacts, the connections heretofore described for measuring the operate time with break contacts are used. However, the selector switch 112 is now positioned on the third contacts. The test pushbutton 114 is depressed long enough to operate the internal relay 120 over a previously described path and then released. Contacts 121 make before the contacts 122 break. Before the internal relay 120 operates, the relay under test operates over the following path: ground, positive coil terminal, relay under test, negative coil terminal, wiper 115, contacts 3 and 4, contacts 122, negative supply terminal, battery, positive supply terminal and ground. Now when the relay 120 operates, contacts 122 break to release the relay under test. Contacts 121 make before contacts 122 break to connect the negative supply terminal to the grid of the L triode of the keyer tube over the following path: grid of the L triode of tube 106, wiper 116, contacts 3, resistance 123, contacts 121, and the negative supply terminal. The keyer tube 106 is now cut-off and pulses are transmitted to the decade counters in a manner heretofore described. The operation hereinafter is similar to that described for the measurement of the operate time with break contacts. When the relay under test restores, its break contacts make at the termination of the unknown period to operate the keyer tube over the following path: grid of the L triode of keyer tube 106, contacts under test, wiper 117, contacts 3 and ground. The keyer tube 106 operating prevents further pulses from being transmitted by the pulse shaper 105.

For measuring the release time with make contacts, the connections heretofore described for measuring the operate time with break contacts are used. However, the selector switch 112 is now positioned on the fourth contacts. The test push button 114 is depressed long enough to operate the internal relay 120 in a manner previously described and then released. The relay under test is operated over the following path: ground, positive coil terminal, relay under test, negative coil terminal, wiper 115, contacts 4, contacts 122, negative supply terminal, battery, positive supply terminal, and ground. When the internal relay operates contacts 121 make to cut-off the keyer tube over the following path: grid of the L triode of tube 106, contacts under test, wiper 117, contact 4, contacts 121, and negative supply terminal. Contacts 122 break to release the relay under test. The keyer tube 106 is now cut-off and pulses are transmitted to the decade counters in a manner heretofore described. The operation hereinafter is similar to that described for the measurement of the operate time with break contacts.

When the relay under test restores the make contacts under test break at the termination of the unknown interval, to open the circuit previously described for maintaining the keyer tube 106 at cut-off. The keyer tube 106 operating prevents further pulses from being transmitted by the pulse shaper 105.

To measure the pulse duration or to integrate the total duration of a series of pulses, the selector switch 112 is positioned to the fifth contacts. The pulse source is connected between the A and ground terminals of the pulse input terminal strip. The polarity must be such that the A terminal is driven negative during the pulse interval. During the unknown interval the keyer tube 106 is cut-off over the following circuit: grid of the L triode of tube 106, wiper 116, and the A terminal of the pulse input strip. The keyer tube 106 is now cut off and the pulses are transmitted to the decade counters in a manner heretofore described. The operation hereinafter is similar to that described for the measurement of the operate time with break contacts. At the termination of the unknown time interval, keyer tube 106 again conducts to prevent further pulses from being transmitted by the pulse shaper 105.

To measure the time interval between pulses, either overlapping or non-overlapping, appearing in separate circuits, or to measure the interval between two pulses appearing consecutively in the same circuit, the selector switch 112 is positioned on the sixth contacts. Considering first the condition of measuring the time interval between pulses appearing in separate circuits, the first pulse output circuit is connected between the terminal "B" of the input pulse strip and the ground pulse terminal. The second pulse output circuit is connected between the "C" terminal of the input pulse strip and the ground pulse terminal. Timing commences when the "B" terminal is driven negative. The unknown time interval terminates when the "C" terminal is driven negative. Tube 111 may be considered to be a buffer stage and the actual pulse converting is produced by the flip-flop stage 107. Initially, both triodes are conducting and the R triode of tube 107 is conducting. Further, the L triode of tube 107 is non-conducting.

It is to be noted that fast waveforms are essential to the operation, since short time constants are employed in the pulse converter so that short intervals may be measured. The first negative pulse is applied to the "B" terminal of the pulse input strip. The pulse then passes through the RC network, resistance 124 and condenser 125, and it appears as a pip on the grid of the L triode of tube 111. The negative pulse cuts off the conduction of the L triode of tube 111. As a result thereof, the L triode of tube 107 starts to conduct. The L triode of tube 107 conducting drives the grid of the R triode of the keyer tube negative to render the same less conductive. As the R triode of tube 106 becomes less conductive, the voltage appearing across the cathode resistor 119' has a lesser positive value. The just-mentioned voltage renders the L triode of the keyer tube 106 non-conducting over the following path: ground, resistor 119', contact 6, wiper 116, resistor 128, and the grid of the L triode of the keyer tube 106. As before mentioned, the keyer tube 106 is normally conducting. The keyer 106 now non-conducting enables the pulse shaper 105 to transmit pulses to the decade counter in a manner heretofore described. The operation hereinafter is similar to that described in reference to the measurement of the operate time with break contacts.

At the termination of the unknow time interval, a negative pulse is applied to the "C" terminal of the pulse input strip. The negative pulse passes through the RC network, resistor 126, and condenser 127, and as a result thereof, a pip is applied to the grid of the R triode of tube 111. This pip causes the R triode of tube 107 to be conductive. As a result thereof, the L triode of tube 107 is rendered non-conducting in the well-known flip-flop action. Therefore, tube 107 is now in its normal state. The R triode of tube 106 is now conducting normally and once again the L triode of tube 106 conducts. Therefore, the pulse shaper no longer transmits pulses to the decade counter. The "B" terminal and the "C" terminal may remain negative or return to its original potential without effecting the operation, once the negative potential is applied. The time interval is read directly from the lamp panel in a manner similar to that described for the measurement of the operate time with break contacts.

When it is desired to measure the time interval between successive pulses appearing in the same circuit, the "B" and "C" pulse terminals are strapped together and are connected to the negative terminal of the pulse source. The positive terminal of the source is connected to the ground pulse terminal. Each negative pulse renders both the L triode and the R triode of tube 111 non-conducting. As a result thereof, a flip-flop action occurs in the converter stage 107 in a well-known manner. Initially the L triode of tube 107 is non-conducting and the R triode of tube 107 is conducting. As a result of the flip-flop action the L triode of the tube 107 is rendered conducting and the R triode of tube 107 is non-conducting. The operation is now similar to that just described for the measurement of the time interval between two pulses in separate circuits. The tube 111 is non-conducting for a short interval. At the termination of the first pulse, the tube 111 once again conducts. The second pulse at the termination of unknown time interval again drives the tube 111 into cut-off. As a result thereof, the flip-flop action is repeated at tube 107 to return the same to its normal state. This flip-flop action occurs in a manner well-known in the art. As a result of the flip-flop action which renders the L triode of tube 107 non-conducting, the R triode of tube 106 is conducting. Therefore, the L triode of tube 106 once again conducts to prevent further pulses from being transmitted by the pulse shaper 105 to the decade counters.

To use the interval timer as a frequency standard or sweep calibrator, the marker switch 129 is turned on thereby opening the cathode circuit of the L triode of the keyer stage 106. The L triode of the keyer tube 106 cannot conduct and therefore the pulse shaper will transmit the pulses to the decade counter continuously in a manner heretofore described. The marker frequency switch enables pulses to be transmitted from any of the decade counters to the marker shaper stage 109. The decade-1 pulse frequency transmitted is 100 kc., which is the oscillator frequency. As previously noted the decade-2 counters operate once for every ten pulses transmitted from the pulse shaper 105. Therefore, the pulse frequency transmitted from the decade-2 counters is 10 kc. In the same light, the pulse frequency transmitted from the decade-3 counter, not shown, is 1 kc., et cetera. The decade counters operate in a manner heretofore described. The marker shaper 109 is used to provide pulse stretching to provide a better marking pulse. The marker shaper 109 is a conventional asymmetrical cathode-coupled multivibrator. The tube 110 is a cathode follower. The marker output pulse is produced across the cathode resistor 131.

When the 100 kc. marker pulses are desired, the marker switch is operated and the marker frequency switch is positioned as shown in Fig. 2. The pulses from the decade-1 counter are coupled through the condenser 108 and are impressed across the RC network, condenser 132 and resistor 133, to ground through the wiper 134. The voltage across resistor 133 is fed to the grid of the L triode of tube 109. The grid of the R triode of the multivibrator 109 is coupled to the plate of the L triode through the coupling condenser 135 and the wiper 136. The multi-vibrator functions in a manner well-known in the art to produce desirable marker pulses. The plate of the R triode of the multi-vibrator 109 is coupled to the grid of the cathode follower 110 through the coupling condenser 137 and the grid resistor 138. Tube 110 conducts in response to the signal received. The marker pulses are produced across the cathode resistor 131 in response to tube 110 conducting.

While there has been described what is at present considered to be the preferred embodiment of the invention, it is to be understood that various modifications may be made thereof, and is contemplated in the appended claims to cover all such modifications within the true spirit and scope of the invention.

What is claimed is:

1. In combination, a scale-of-five counter comprising a plurality of pairs of thermionic tubes, each tube comprising an anode, a cathode and a control grid, one tube of each pair being designated as the data-registering tube, means coupling the tubes of a pair for trigger operation in response to electric signals, connections between the anode of a data-registering tube of a pair and the grid of a data-registering tube of another pair creating a sequential operation, electric signal means common to all of said pairs of tubes for providing a sequential operation of said counter in a first sequence of five digits, means for sequentially re-operating said counter in response to said electric signal means in a second sequence of five digits, a scale-of-two counter comprising a pair of thermionic tubes, each tube comprising an anode, a cathode and a control grid, each of said anodes having directly connected thereto a single master lamp, said lamps operated directly responsive only to any conduction of the tube of said scale-of-two counter to which they are connected, means coupling said scale-of-two counter and one of said plurality of pairs of thermionic tubes of said counter to provide for a triggering operation of said scale-of-two counter in response to the operation of said one pair of said plurality of tubes of said counter, one tube of said pair of thermionic tubes of said scale-of-two counter conducting only while said counter is operated in said first sequence of five digits and the other tube of said pair of thermionic tubes of said scale-of-two counter conducting only while said counter is re-operated in said second sequence of five digits, a plurality of lamps, each lamp operative to indicate either one of two digits, single ones of said plurality of lamps connected to corresponding anodes of said data-registering tubes of said plurality of pairs of thermionic tubes to provide an indication of said one of two digits in direct response only to any conduction of the tube connected thereto, the ultimate designation of the digit being indicated depending upon which master lamp is operated.

2. In a counter circuit, a plurality of pairs of thermionic tubes, each tube comprising an anode, a cathode and a control grid, one tube of each pair being designated as the data-registering tube, means coupling the tubes of a pair so that only one tube of a pair can conduct at one time, a resistor common to said cathode of each of said data-registering tubes for producing a self-biasing voltage, connections between the anode of a data-registering tube of a pair and the grid of the data-registering tube of another pair creating a sequential operation so that only one data-registering tube can conduct at one time, a pulsing circuit producing a voltage across said common cathode resistor for providing a sequential operation by producing a cut-off potential to the one operating data-registering tube, a fixed source of potential, an asymmetrical conductor, and a circuit connecting said asymmetrical conductor, said common cathode resistor and said fixed source of potential so that when the self-biasing potential falls below a predetermined value, current will flow through said asymmetrical conductor thereby connecting said fixed source of potential to said common cathode resistor to prevent false operation of said counter circuit from tube breakdown.

3. A counter circuit as claimed in claim 2 in which said asymmetrical conductor is a rectifier.

4. In a decade counter, a first plurality of pairs of thermionic tubes, each tube comprising an anode, a cathode and a control grid, one tube of each pair being designated as a data-registering tube, means coupling the tubes of each pair so that only one tube of a pair can conduct at one time, a first resistor common to the cathodes of each said data-registering tubes for producing a self-biasing voltage, circuits connecting each of said pairs of thermionic tubes by connecting the anode of a data-registering tube of one pair to the grid of a data-registering tube of a next succeeding pair for creating a sequential operation, said circuits permitting only one data-registering tube to conduct at one time, a pulsing circuit for producing a voltage across said first resistor for providing a sequential operation by producing a cut-off potential to the one conducting data-registering tube, a scale-of-two counter comprising a pair of thermionic tubes, each tube of the last-mentioned pair of thermionic tubes having a cathode, a second resistor common to the cathodes of the pair of thermionic tubes of said scale-of-two counter, a first cathode follower connected to one pair of thermionic tubes of said first plurality, said cathode follower operated only in response to each optimum operation of one pair of thermionic tubes of said first plurality, a circuit coupling said first cathode follower only to said second cathode resistor for providing for a flip-flop operation of said scale-of-two counter in response to the operation of said first cathode follower, and a second cathode follower connected to said scale-of-two counter, said second cathode follower operated in response to every second flip-flop operation of said scale-of-two counter for providing required output pulses.

5. In a decade counter, a first plurality of pairs of thermionic tubes, each of said tubes comprising an anode, a cathode and a control grid, one tube of each of said pairs being designated as a data-registering tube, means coupling the tubes of each pair so that only one tube of a pair can conduct at one time, a first resistor common to the cathode of each of said data-registering tubes for producing a self-biasing voltage, alternating current circuits connecting each of said pairs of thermionic tubes by connecting the anode of a data-registering tube of one pair to the grid of a data-registering tube of a next succeeding pair for creating a sequential operation, said circuits permitting only one data-registering tube to conduct at one time, a pulsing circuit for producing a voltage across said first resistor for providing a sequential operation by producing cut-off potential to the one conducting data-registering tube, a scale-of-two counter comprising a pair of thermionic tubes, each tube of the last-mentioned pair of thermionic tubes having a cathode, a second resistor common to the cathode of the pair of thermionic tubes of said scale-of-two counter, a first cathode follower connected to one pair of thermionic tubes of said first plurality, said cathode follower operated only in response to each optimum operation of one of said pair of thermionic tubes of said first plurality, a circuit coupling said first cathode follower only to said second cathode resistor for providing for a flip-flop operation of said scale-of two counter in response to the operation of said first cathode follower, and a second cathode follower connected to said scale-of-two counter, said second cathode follower operated in response to every second flip-flop operation of said scale-of-two counter for providing required output pulses.

6. In a decade counter, a first plurality of pairs of thermionic tubes, each tube comprising an anode, a cathode, and a control grid, one tube of each pair being designated as a data-registering tube, means coupling the tubes of each pair so that only one tube of a pair can conduct at one time, a first means for biasing each of said data-registering tubes to a cut-off potential, circuits connecting each of said pairs of thermionic tubes by connecting the anode of a data-registering tube of one pair to the grid of the data-registering tube of a next succeeding pair for creating a sequential operation, said circuits permitting only one data-registering tube to conduct at one time, a pulsing circuit for producing a voltage across said first means for providing a sequential operation by producing a cut-off potential to the one conducting data-registering tube, a scale-of-two counter comprising a pair of thermionic tubes, each tube of the last mentioned pair of thermionic tubes having a cathode, a first cathode resistor common to the cathodes of the pair of thermionic tubes of said scale-of-two counter, a first cathode follower connected to one pair of thermionic tubes of said first plurality, said cathode follower operated only in response to each optimum operation of one pair of thermionic tubes of said first plurality, a circuit coupling said first cathode follower only to said first cathode resistor for providing for a flip-flop operation of said scale-of-two counter in response to the operation of said first cathode follower, and a second cathode follower connected to said scale-of-two counter, said second cathode follower operated in response to every second flip-flop operation of said scale-of-two counter for providing required output pulses.

7. In a decade counter, a first plurality of pairs of thermionic tubes, each tube comprising an anode, a cathode, and a control grid, one tube of each pair being designated as a data-registering tube, means coupling the tubes of each pair so that only one tube of a pair can conduct at one time, a first means for biasing each of said data-registering tubes to a cut-off potential, circuits interconnecting each of said pairs of thermionic tubes for providing a sequential operation, said circuits permitting only one data-registering tube to conduct at one time, a pulsing circuit for producing a voltage across said first means for providing a sequential operation by producing a cut-off potential to the one conducting data-registering tube, a scale-of-two counter comprising a pair of thermionic tubes, each tube of the last mentioned pair of thermionic tubes having a cathode, a first cathode resistor common to the cathodes of the pair of thermionic tubes of said scale-of-two counter, a first cathode follower connected to one pair of thermionic tubes of said first plurality, said cathode follower operated only in response to each optimum operation of one pair of thermionic tubes of said first plurality, a circuit coupling said first cathode follower only to said first cathode resistor for providing for a flip-flop operation of said scale-of-two counter in response to the operation of said first cathode follower, and a second cathode follower connected to said scale-of-two counter, said second cathode follower operated in response to every second flip-flop operation of said scale-of-two counter for providing required output pulses.

8. In a decade counter, a first plurality of pairs of thermionic tubes, each tube comprising an anode, a cathode, and a control grid, one tube of each pair being designated as a data-registering tube, means coupling the tubes of each pair so that only one tube of a pair can conduct at one time, a first means for biasing each of said data-registering tubes, circuits interconnecting each of said pairs of thermionic tubes for providing a sequential operation, said circuits permitting only one data-registering tube to conduct at one time, a pulsing circuit for disabling the one conducting data-registering tube to provide a sequential operation, a scale-of-two counter comprising a pair of thermionic tubes, each tube of the last-mentioned pair of thermionic tubes having a cathode, a first cathode resistor common to the cathode of the pair of thermionic tubes of said scale-of-two counter, a first cathode follower connected to one pair of thermionic tubes of said first plurality, said cathode follower operated only in response to each optimum operation of one pair of thermionic tubes of said first plurality, a circuit coupling said first cathode follower only to said first cathode resistor for providing for a flip-flop operation of said scale-of-two counter in response to the operation of said first cathode follower, and a second cathode follower connected to said scale-of-two counter, said second cathode follower operated in response to every second flip-flop operation of said scale-of-two counter for providing required output pulses.

9. In a decade counter, a first plurality of pairs of thermionic tubes, each tube comprising an anode, a cathode, and a control grid, one tube of each pair being designated as a data-registering tube, means coupling the tubes of each pair so that only one tube of a pair can conduct at one time, a first means for biasing each of said data-registering tubes, circuits interconnecting each of said pairs of thermionic tubes for providing a sequential operation, said circuits permitting only one data-registering tube to conduct at one time, a pulsing circuit for disabling the one conducting data-registering tube to provide a sequential operation, a scale-of-two counter, a first cathode follower connected to one pair of thermionic tubes of said first plurality, said cathode follower operated only in response to each optimum operation of one pair of thermionic tubes of said first plurality, a circuit coupling only said scale-of-two counter and said first cathode follower to provide a flip-flop operation in said scale-of-two counter in response to the operation of said first cathode follower, and a second cathode follower connected to said scale-of-two counter, said second cathode follower operated in response to every second flip-flop operation of said scale-of-two counter for providing output pulses.

10. In a counter circuit having data-registering tubes in which a self-biasing circuit is used for biasing said data-registering tubes at a predetermined value, a fixed source of potential capable of biasing said data-registering tubes at said pre-determined value and an asymmetrical conductor connected between said self-biasing circuit and said fixed source of potential, said conductor preventing any flow of current from said fixed source of potential when said self-biasing circuit is normal and effective when the bias of said data-registering tubes falls below said predetermined value to cause said fixed source of potential to be effectively applied to said self-biasing circuit to thereby maintain said bias of said data-registering tubes at said predetermined value to prevent false operation of said counter circuit from tube breakdown.

11. In a counter circuit comprising thermionic tubes connected in cascade and in which a self-biasing circuit is common to all of the tubes operating as data-registering tubes for biasing said data-registering tube at a predetermined value, a fixed source of potential capable of biasing said data-registering tubes at said predetermined value and an asymmetrical conductor connected between said self-biasing circuit and said fixed source of potential, said conductor preventing any flow of current from said fixed source of potential when said self-biasing circuit is normal and effective when the bias of said data-registering tubes falls below said predetermined value to cause said fixed source of potential to be effectively applied to said self-biasing circuit to thereby maintain said bias of said data-registering tubes at said predetermined value to prevent false operation of said counter circuit from tube breakdown.

12. A counting circuit comprising a first plurality of pairs of discharge tubes, each tube including an anode and a control grid, one tube of each pair being designated as the data-registering tube, means coupling the tubes of a pair for trigger operation in response to electric signals, connections between the anode of a data-registering tube of a pair and the grid of a data-registering tube of another pair creating a sequential operation, a source of periodic electric signals, means common to all of said pairs of tubes of said first plurality of pairs of tubes for applying said periodic electric signals to provide a sequential operation of said counter in a first sequence of digits, means for sequentially re-operating said counter in a second sequence of digits in response to said periodic electric signals, a binary counter comprising a pair of discharge tubes, each tube including an anode and a control grid, each of said anodes having directly connected thereto a single master lamp, said lamps operated directly responsive only to any conduction of the tube of said binary counter to which they are connected, means coupling said binary counter and one of said first plurality of pairs of discharge tubes to provide for a triggering operation of said binary counter in response to the operation of said one pair of said first plurality of discharge tubes, one tube of said binary counter conducting to operate its said associated master lamp during said operation of said counter in said first sequence of digits and the other tube of said binary counter conducting to operate its said associated master lamp during said re-operation of said counter in said second sequence of digits, a plurality of lamps, each lamp operative to indicate a digit in either one of two sequences of digits, single ones of said plurality of lamps connected to corresponding anodes of said data-registering tubes of said plurality of pairs of discharge tubes to provide an indication of a digit in either one of said two sequences of digits in direct response only to any conduction of the tubes connected thereto, the one of said master lamps operated designating the sequence in which said indicated digit falls.

References Cited in the file of this patent

UNITED STATES PATENTS

| | | |
|---|---|---|
| 2,332,300 | Cook | Oct. 19, 1943 |
| 2,394,084 | Livingston | Feb. 5, 1946 |
| 2,394,903 | Fetcher et al. | Feb. 12, 1946 |
| 2,422,698 | Miller | June 24, 1947 |
| 2,436,963 | Grosdoff | Mar. 2, 1948 |
| 2,485,825 | Grosdoff | Oct. 25, 1949 |
| 2,521,787 | Grosdoff | Sept. 12, 1950 |
| 2,539,014 | Frantz | Jan. 23, 1951 |
| 2,547,511 | Weissman | Apr. 3, 1951 |
| 2,574,283 | Potter | Nov. 6, 1951 |

OTHER REFERENCES

"Electronic Computing Circuits of the Eniac," A. W. Burks, Proc. I. R. E., volume 35, No. 8, August 1947, pp. 756–767.

"High-Speed N-Scale Counters," T. K. Sharpless, Electronics, March 1948, pp. 122–125.